ured Dec. 3, 1957

2,815,338
BASIC AZO DYESTUFFS

Rudolf Ruegg, Basel, Switzerland, assignor to Ciba Limited, Basel, Switzerland, a Swiss firm No Drawing. Application May 6, 1955,
Serial No. 506,657

Claims priority, application Switzerland May 13, 1954

9 Claims. (Cl. 260—152)

This invention provides now basic dyestuffs which, like the dyestuff of the formula (1) 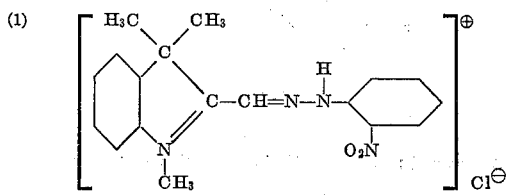

are free from sulfonic acid and carboxylic acid groups. The new dyestuffs exist in two forms and correspond to the formulae (2a) and (2b), (2a) representing salts and (2b) representing the corresponding free bases:

(2a) 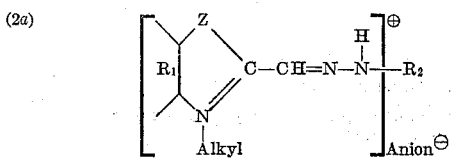

(2b) 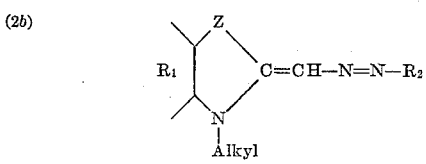

In these formulae $R_1$ represents a benzene or naphthalene radical fused on to the heterocyclic ring at the positions indicated by the valence bonds, Z represents a sulfur atom or an

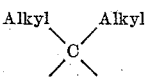

group and $R_2$ represents a benezene radical containing a single nitro group in ortho-position to the amino group or an anthraquinone radical bound in the 1-position to the —NH— group or a radical of the formula (3a) 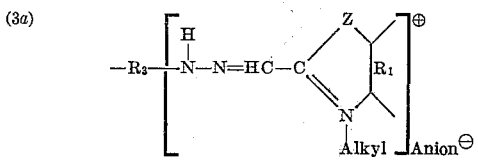

or (3b) 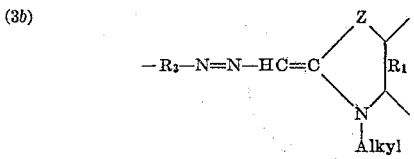

in which Z and $R_1$ have the meanings given above, and $R_3$ represents an anthraquinone radical bound in α-positions to the two —NH— groups.

By means of an alkali, such as for instance ammonia, the salts of the Formula 2a can easily be converted into the corresponding bases of the Formula 2b.

The invention also provides a process for the manufacture of the aforesaid dyestuffs, wherein a diazo-compound of a mononitro-orthoaminobenzene or of a 1-aminoanthraquinone is additively combined on one side or a tetrazo-compound of an α:α-diaminoanthraquinone is additively combined on both sides with a base of the formula (4) 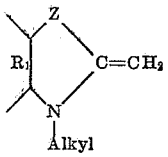

or such diazo-compound is condensed on one side or such tetrazo compound on both sides with a salt of the formula (5) 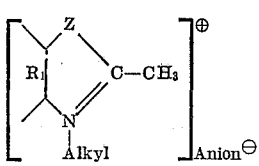

in which formulae $R_1$ represents a benzene or naphthalene radical fused on to the heterocyclic ring at the positions indicated by the valence bonds, and Z represents a sulfur atom or an $$\text{Alkyl}\diagdown\text{C}\diagup\text{Alkyl}$$

group, and wherein the starting materials are free from sulfonic acid and carboxylic acid groups.

As starting materials there are advantageously used tetrazo or more especially diazo-compounds of the above kind, in which the diazotized amino groups are bound to carbon atoms which are vicinal to a carbon atom bound to a hydrogen atom, that is to say, diazo compounds of 1-amino-2-nitrobenzenes unsubstituted in the 6-position or of α-amino-anthraquinones unsubstituted in a vicinal β-position, or tetrazo compounds of α:α-diaminoanthraquinones unsubstituted in vicinal β-positions.

The mononitro-ortho-aminobenzenes, of which the diazo compounds are used as starting materials in the present process, may contain further substituents, for example, alkyl groups such as ethyl or methyl groups; alkoxy groups such as ethoxy or methoxy groups; halogen atoms such as chlorine atoms; acylamino groups such as acetylamino groups; or dialkylamino groups such as dimethylamino groups, but they must be free from further nitro groups and also from sulfonic acid and carboxylic acid groups. As examples there may be mentioned:

1-amino-2-nitrobenzene,
1-amino-2-nitro-4-methylbenzene,
1-amino-2-nitro-4-methoxybenzene,
1-amino-2-nitro-4-chlorobenzene,
1-amino-2-nitro-4-acetylaminobenzene,
1-amino-2-nitro-4-dimethylaminobenzene,
1-amino-2-nitro-4-phenylbenzene,
1-amino-2-nitro-4-(N:N-methylacetyl)-aminobenzene,
1-amino-2-nitro-4-cyclohexylbenzene, and
1-amino-2-nitro-5-phenylaminobenzene.

The anthraquinone compounds which may be used as starting materials may contain, in addition to the diazotized amino groups, further substituents, for example, those mentioned above. There may be used, for example, diazo compounds of the following aminoanthraquinones:

1-aminoanthraquinone,
1-amino-4-methoxyanthraquinone,
1-amino-4-hydroxyanthraquinone,
1-amino-4-chloranthraquinone,
1:8-, 1:4- or especially 1:5-diaminoanthraquinone.

The bases of the Formula 4 also serving as starting materials in the present process and the quaternary so-called cyclo-ammonium salts of the Formula 5 derived from these bases, contain as a member of the heterocyclic ring either a sulfur atom or a carbon atom bound to two alkyl groups. There are advantageously used compounds, wherein the alkyl group bound to the nitrogen atom, and when Z represents an

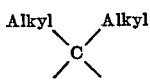

group also the alkyl radicals of the latter group, contain only few, for example, at most four carbon atoms. Especially important are bases and salts of the formulae (6) 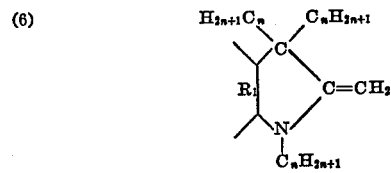

and (7) 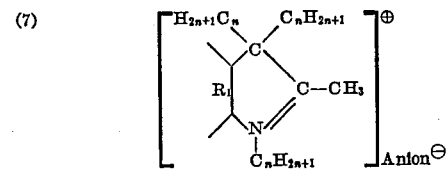

in which n represents a whole number not greater than 2, and advantageously 1. The radical $R_1$ may be a naphthalene or benzene radical fused on to the heterocyclic ring in the manner shown and may contain in the condensed aromatic radical substituents, for example, those mentioned above in connection with the diazo-compounds.

As examples of bases of the Formula 4 there may be mentioned the following compounds (8) 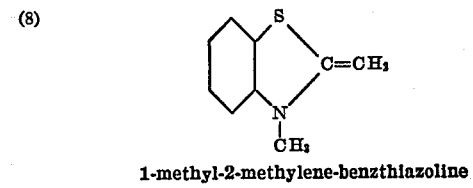
1-methyl-2-methylene-benzthiazoline (9) 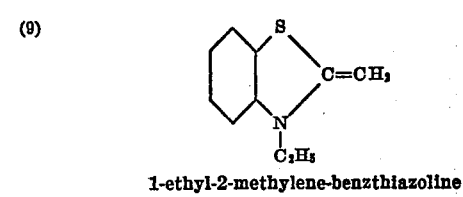
1-ethyl-2-methylene-benzthiazoline

(10) 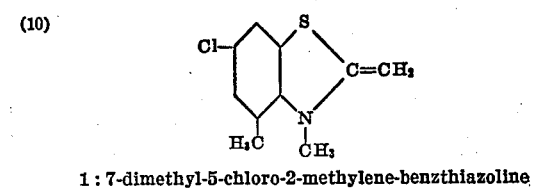
1:7-dimethyl-5-chloro-2-methylene-benzthiazoline

(11) 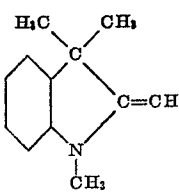
1:3:3-trimethyl-2-methylene-indoline

(12) 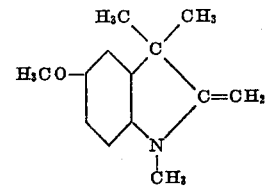
5-methoxy-1:3:3-trimethyl-2-methylene-indoline

(13) 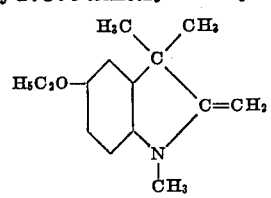
5-ethoxy-1:3:3-trimethyl-2-methylene-indoline

(14) 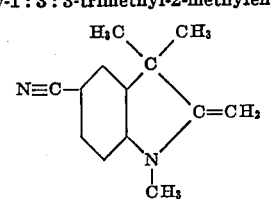
5-cyano-1:3:3-trimethyl-2-methylene-indoline (obtainable by condensing para-cyanophenylhydrazine with ethylmethyl ketone and reacting the resulting 2:3-dimethyl-5-cyano-indole with methyl bromide)

(15) 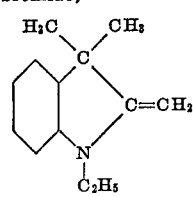
1-ethyl-3:3-dimethyl-2-methylene-indoline

(16) 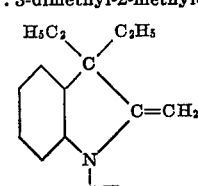
1:3:3-triethyl-2-methylene-indoline

(17) 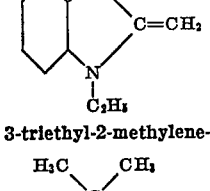
7-chloro-1:3:3-trimethyl-2-methylene-indoline

(18) 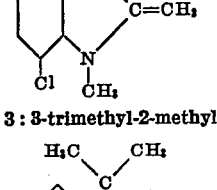
1:3:3-trimethyl-2-methylene-6:7-benzo-indoline

(19)
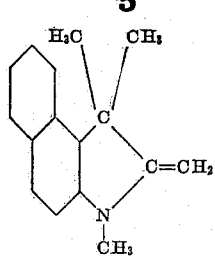
1 : 3 : 3-trimethyl-2-methylene-4 : 5-benzo-indoline

(20)
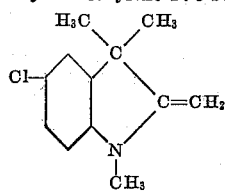
5-chloro-1 : 3 : 3-trimethyl-2-methylene-indoline

(21)
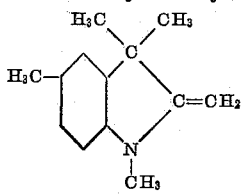
5-methyl-1 : 3 : 3-trimethyl-2-methylene-indoline

The bases to be used as starting materials in the present process are largely known, and they can be made by methods in themselves known. The bases may be converted into salts of the Formula 5 by means of acids. Any desired acid may be used, but it is usually of advantage to use simple easily accessible acids, for example, hydrochloric acid, sulfuric acid or acetic acid.

As stated above, in the present process diazo-compounds of mononitro-ortho-aminobenzenes or of 1-aminoanthraquinones or tetrazo-compounds of α:α-diaminoanthraquinones are reacted with bases of the Formula 4 or salts of the Formula 5. Accordingly, the diazo-compounds contain in a position vicinal to the diazotized amino group a substituent imparting a strongly negative character, that is to say, in the case of diazo compounds of the benzene series, nitro groups and in the case of diazo- or tetrazo-compounds of the anthraquinone series, carbonyl groups. As diazo-compounds there may be used not only diazonium salts such as diazonium chlorides or sulfates, but also antidiazotates or if desired diazoxides.

The reaction of the diazo compounds with the bases of the Formula 4 or with the salts of the Formula 5 is carried out with advantage in an aqueous and advantageously an acid medium.

It is usually desirable to buffer any excess of mineral acid during the reaction by a suitable addition, such as sodium acetate to the sodium bicarbonate or pyridine. In some cases, especially with diazo-compounds of amino-anthraquinones, it may be of advantage to carry out the reaction in an organic solvent, for example, glacial acetic acid, benzene or acetone. In other respects the reactions are carried out under the conditions hereinbefore described, that is to say, in such manner that only one molecular proportion of a diazo compound of the kind described above couples with 1 molecular proportion of a base of the Formula 4 or of a salt of the Formula 5 and only one molecular proportion of a tetrazo-compound couples with two molecular proportions of the base or salt. If bases or salts are used which contain as Z a carbon atom bound to two alkyl groups, the danger of the reaction taking an undesired course is very small. If, on the other hand, Z represents a sulfur atom, it is necessary to avoid an excess of the diazo compound, as otherwise two molecular proportions of the diazo-compound may easily combine additively with one molecular proportion of the base or two molecular proportions of the diazo compound may condense with one molecular proportion of the quaternary salt of the base.

The new dyestuffs of the Formula 2 are suitable for dyeing and printing a very wide variety of materials, especially polyacrylonitrile fibers. These fibers may, for example, be composed solely of polyacrylonitrile or of copolymers which contain a substantial amount of acrylonitrile copolymerized therein, or mixtures of different polymers containing a substantial amount of polyacrylonitrile.

Dyeing is usually carried out with advantage in an aqueous medium. The dyestuffs of the Formula 2 are usually sufficiently soluble in water to enable them to be used for dyeing in the form of aqueous solutions. The products which are sparingly soluble in water, and cannot be applied from aqueous solution, may be applied by the dispersion dyeing process customary for cellulose acetate artificial silk and nylon, in which the dyestuff is dispersed by means of a suitable dispersing agent, for example, with a soap, a benzimidazole sulfonic acid having a higher alkyl radical in the μ-position of the imidazole radical or a polyglycol ether of a fatty alcohol of high molecular weight, and the dyestuff is used in this dispersed form.

In some cases it is of advantage, before adding a sparingly soluble dyestuff to the dyebath, to dissolve it or make it up into a paste as uniformly as possible in a suitable, and advantageously water-miscible, organic solvent or diluent.

It is generally desirable to carry out the dyeing in a weakly acid, for example, acetic acid, bath at a raised temperature. For example, the dyeing process may be commenced at a moderately raised temperature of about 40–70° C. and finished at the boiling temperature of the dyebath. Especially valuable results are often produced by dyeing under pressure, that is to say, in a closed vessel at a temperature of 100–130° C.

The above remarks with regard to the various methods of dyeing apply also to the printing of polyacrylonitrile fibers.

The dyeings so produced are distinguished in general by their pure tints, and above all by their very good properties of fastness. Thus, for example, dyeings of very good fastness to light are obtained, and the resistance of the dyeings to treatments with alkalies, for example, washing in an alkaline medium for long periods, is surprisingly good. The dyeings also possess good fastness to perspiration. Especially advantageous, also, is the property of these dyestuffs for reserving wool fibers present in the dyebath, so that these fibers can, if desired, be dyed in a further bath with an ordinary wool dyestuff.

The dyeings obtainable in accordance with this invention may, if desired, be subjected to various after-treatments. Thus, for example, such a dyeing may be soaped at a moderately raised temperature or subsequently steamed without being intermediately dried. Moreover, a subsequent heat treatment at a temperature above 100° C., for example, at 120–130° C., may be of advantage.

The following examples illustrate the invention, the parts and percentages being by weight unless otherwise stated and the relationship of parts by weight to parts by volume being the same as that of the kilogram to the liter:

*Example 1*

13.8 parts of 1-amino-2-nitrobenzene are suspended in the form of a fine powder in 100 parts of water and 100 parts of ice, and then 25 parts by volume of a 4N-solution of sodium nitrite are added. 30 parts by volume of hydrochloric acid of 30 percent strength are then rapidly added, in one portion, while stirring. The whole is stirred for a further 15 minutes at 0–5° C., and filtered, if necessary, after the addition of aminosulfonic acid. 17.5 parts of 1:3:3-trimethyl-2-methylene-indoline of the above Formula 11 are dissolved in 200 parts of ice water with the addition of 15 parts by volume of hydrochloric acid of 30 percent strength. The above-mentioned diazo solution is added dropwise in the course of 15 minutes at 0–5° C. to the hydrochloric acid solution of 1:2:3:3-tetramethyl-indolinium chloride, and then the excess of hydrochloric acid is neutralized by adding about 100 parts by volume of a 4N-solution of sodium acetate in the course of 2 hours. The mixture is stirred for a further 16 hours at 0–5° C., and, if necessary by the further addition of sodium acetate solution, the dyestuff suspension is maintained weakly acid. The dyestuff which corresponds to the formula

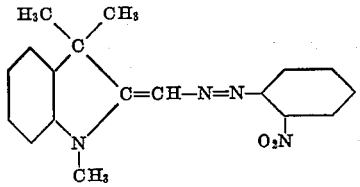

is filtered off and washed with 500 parts of ice water. When dry, it is a red-yellow powder which dissolves in water with a red-yellow coloration and dyes polyacrylonitrile staple fibers from an acetic acid bath full red-yellow tints of good fastness to light.

By using instead of 13.8 parts of 1-amino-2-nitrobenzene, 15.2 parts of 1-amino-2-nitro-4-methylbenzene or 17.3 parts of 1-amino-2-nitro-4-chlorobenzene, there are obtained dyestuffs having similar properties.

By using 16.8 parts of 1-amino-2-nitro-4-methoxy-benzene or 18.2 parts of 1-amino-2-nitro-4-ethoxy-benzene or 19.5 parts of 1-amino-2-nitro-4-acetylamino-benzene, instead of 13.8 parts of 1-amino-2-nitrobenzene, dyestuffs are obtained which dye polyacrylonitrile fibers from an acetic acid bath red orange to scarlet tints which are fast to light. The dyestuff obtained from 1-amino-2-nitro-4-acetylamino-benzene has the formula

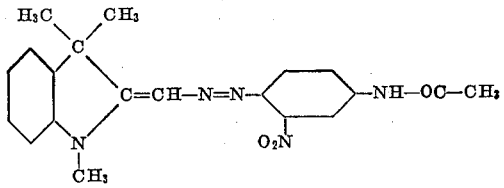

By using 18.1 parts of 1-amino-2-nitro-4-(dimethylamino)-benzene, instead of 13.8 parts of 1-amino-2-nitrobenzene, there is obtained a dyestuff which dyes polyacrylonitrile fibers fast blue tints.

From the dyestuff prepared as described in the first paragraph of the present example the free base may be obtained as follows:

30 parts of the last-named dyestuff are dissolved in 1000 parts of boiling water with addition of 10 parts by volume of hydrochloric acid of 30% strength. The solution is filtered in the hot in order to remove any solid impurities and then cooled to 30° C. by the addition of ice. At this temperature concentrated aqueous ammonia is added to the solution until a pH value of 10 is reached. The free base precipitates in reddish orange flakes and is then filtered off, washed with cold water and dried in vacuo at 60–70° C. It forms a reddish orange powder melting at 153° C.

Example 2

7 parts of powdered sodium nitrite are introduced in small portions at 0–5° C. into 120 parts of concentrated sulfuric acid. The suspension is heated to 80° C. in the course of ½ hour, whereby a clear solution of nitrosyl-sulphuric acid is obtained. After cooling the mixture to 20° C., 22.3 parts of 1-amino-anthraquinone in the form of a fine powder are added at 20–30° C. The whole is stirred in an open vessel for a further 20 hours at 30–35° C., and then 600 parts of ice are introduced. They grey diazo-suspension is then, if desired, after the addition of amino-sulfonic acid, introduced in the course of ½ hour at 0–5° C. into a solution of 17.5 parts of 1:3:3-trimethyl-2-methylene-indoline of the Formula 11 in 200 parts of ice water, and 15 parts by volume of hydrochloric acid of 30 percent strength. In the course of one hour the bulk of the sulfuric acid is neutralized by the addition of about 300 parts of powdered crystalline sodium acetate. The whole is stirred for a further 20 hours at 0–5° C., and the dyestuff is then filtered off and washed with 500 parts of water. The dry dyestuff which corresponds to the formula

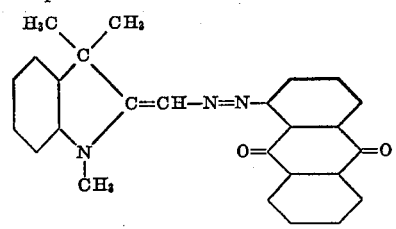

is a brown red powder which dissolves in water with a red-orange coloration and dyes polyacrylonitrile staple fibres from an acetic acid bath orange tints which are very fast to light.

By using instead of 22.3 parts of 1-aminoanthraquinone, 25.3 parts of 1-amino-4-methoxy-anthraquinone, there is obtained a dyestuff which dyes polyacrylonitrile fibers blue-red tints.

A red dyestuff having similar properties is obtained by using 11.9 parts of 1:5-diaminoanthraquinone.

Example 3

Into a solution of nitrosyl-sulfuric acid prepared as described in Example 2 there are introduced at 30–40° C. in small portions 23.9 parts of 1-amino-4-hydroxy-anthraquinone, while stirring. In order to induce the diazotization there are then introduced at —10° C. 90 parts of ice, whereupon the temperature rises to 20° C. After a short time the brown solution is poured on to 300 parts of ice. The yellow diazonium sulfate is filtered off, and then triturated with 300 parts of water, whereby it changes into the red diazoxide compound, which is filtered off and washed with water until neutral. 17.5 parts of 1:3:3-trimethyl-2-methylene-indoline are mixed with 75 parts of glacial acetic acid, and added to a suspension of the above diazoxide compound in 1000 parts of glacial acetic acid at 15–25° C., while stirring. After a few hours, 150 parts by volume of a saturated solution of sodium chloride are added to the dark red solution, and then the dyestuff is filtered off and washed with water until neutral. The dried dyestuff is a dark powder, which dissolves in hot water with a blue-red coloration and dyes polyacrylonitrile fibers from an acetic acid bath fast blue-red tints.

Example 4

22.3 parts of 1-aminoanthraquinone are diazotized as described in Example 2 and reacted in the same manner with 21.7 parts of 5-ethoxy-1:3:3-trimethyl-2-methylene-indoline of the Formula 13. There is obtained a dyestuff of the formula

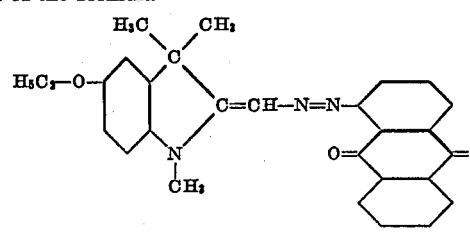

which, when dry, is a brown-red powder which dissolves in water with a red coloration and dyes polyacrylonitrile fibers fast red-orange tints.

By using, instead of the diazo compound of 22.3 parts of 1-aminoanthraquinone, the diazo-compound prepared in the usual manner from 16.8 parts of 1-amino-2-nitro- 4-methoxybenzene, there is obtained a dyestuff which dyes polyacrylonitrile fibers red tints.

By using, instead of 21.7 parts of 5-ethoxy-1:3:3-trimethyl-2-methylene-indoline, 22.3 parts of 1:3:3-trimethyl-2-methylene-6:7-benzo-indoline of the Formula 18, there is obtained a dyestuff which likewise dyes polyacrylonitrile fibers red tints.

*Example 5*

27.5 parts of 1:2-dimethyl-benzthiazolium methosulfate, obtainable from 2-methyl-benzthiazole and dimethylsulfate and which in its free base state corresponds to Formula 8, are suspended in 250 parts by volume of benzene, and then 25 parts by volume of sodium hydroxide solution of 30 percent strength are added while stirring vigorously. After a few minutes, the benzene layer containing the methylene base is separated and thoroughly mixed with the diazonium solution of 13.8 parts of 1-amino-2-nitrobenzene prepared in the usual manner, the mixing being carried out, for example, in a mortar. The resulting dyestuff having the formula

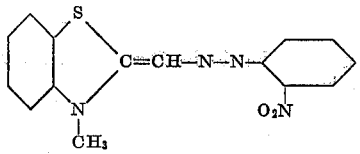

is filtered off after a short time and dried at 40–50° C. It is a brown-orange powder which dissolves in water with a yellow coloration and dyes polyacrylonitrile fibers from acetic acid baths pure yellow tints of good fastness to light. When wool is present at the same time it is not dyed.

*Example 6*

A diazo-suspension prepared as described in Example 2 from 22.3 parts of 1-aminoanthraquinone is filtered, the filter residue is washed with water and freed as far as possible from adherent water by pressing. The pressed material is then suspended in 500 parts by volume of acetone. 28.9 parts of 1-ethyl-2-methyl-benzthiazolium methosulfate, which in its free base state corresponds to Formula 9, are suspended in 500 parts by volume of benzene, and then 50 parts by volume of sodium hydroxide solution of 30 percent strength are added, while stirring vigorously. After a few minutes the benzene layer containing the methylene base is separated, and added rapidly and in one portion to the acetone diazo-suspension, while stirring. After a few hours the reaction mass is dried at ordinary temperature in vacuo. The dyestuff is dissolved in boiling water, filtered to remove sparingly soluble matter, and precipitated by means of a saturated solution of sodium chloride. When dry, it is a red powder which dissolves in water with an orange coloration and dyes polyacrylonitrile fibers very fast yellow-orange tints.

*Example 7*

21.5 parts of 1:3:3-triethyl-2-methylene-indoline are dissolved in 200 parts of ice water with the addition of 30 parts by volume of hydrochloric acid of 30 percent strength. A diazonium solution of 13.8 parts of 1-amino-2-nitrobenzene prepared in the usual way is added dropwise in the course of one hour while stirring at 0 to 5° C. to the above solution. In the course of some hours the excess hydrochloric acid is neutralized by the addition of about 150 parts by volume of a 4N-solution of sodium acetate. After a few hours more, the formation of the dyestuff which proceeds very slowly is completed by the addition of about 50 parts of pyridine.

The dyestuff which is a dark brown resin is dissolved in the warm in a condensation product of a higher aliphatic alcohol with ethylene oxide and, after cooling, is triturated with an excess of amido-sulfonic acid. This dyeing preparation dissolves in water with a red-yellow coloration and dyes polyacrylonitrile fibers red-yellow.

*Example 8*

0.5 part of the dyestuff obtained as described in the first paragraph of Example 2 is pasted with 0.5 part of acetic acid of 40 percent strength. The mixture is covered with hot water, the whole is boiled and combined through a sieve with an aqueous solution which contains 3–5 parts of acetic acid of 40 percent strength, 1–3 parts of sodium acetate and 4 parts of a condensation product of ethylene oxide and commercial octyl alcohol. The volume of the dyebath so prepared is made up to 4000 parts by volume. A well desized yarn of polyacrylonitrile staple fibers is entered at 50–60° C., the bath is raised to the boil in the course of 30–45 minutes, and then dyeing is carried on for one hour as near to the boiling temperature as possible. The yarn is then rinsed with cold water and, if desired, soaped for a short time, for example, at 60–80° C. in a bath which contains 1–2 parts of sodium μ-heptadecyl-N-benzyl-benzimidazole disulfonate in 1000 parts of water. The yarn is dyed orange, and the dyeing is distinguished by its very good fastness to light.

What is claimed is:

1. A dyestuff which is free from sulfonic acid and carboxylic acid groups and in its free base state corresponds to the formula

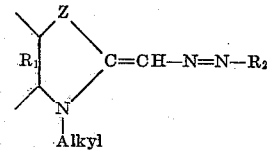

in which $R_1$ represents a member selected from the group consisting of a benzene and a naphthalene radical, said radical being fused on to the heterocyclic ring at the positions indicated by the valence bonds, Z represents a member selected from the group consisting of a sulfur atom and an

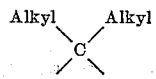

group, and $R_2$ represents a member selected from the group consisting of a benzene radical containing a single nitro group in ortho-position to the —N=N— group, an anthraquinone radical bound in the 1-position to the —N=N— group, and a radical of the formula

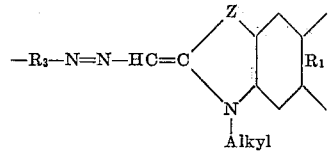

in which Z and $R_1$ have the meanings given above, and $R_3$ represents an anthraquinone radical bound in α-positions to the two —N=N— groups each "Alkyl" radical containing at the most 2 carbon atoms.

2. A dyestuff which is free from sulfonic acid and carboxylic acid groups and in its free base state corresponds to the formula

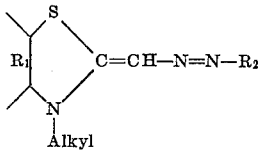

in which $R_1$ represents a benzene radical fused on to the heterocyclic ring at the positions indicated by the valence bonds, the Alkyl radical contains at the most two carbon atoms and $R_2$ represents a benzene radical containing a single nitro group in ortho-position to the —N=N— group.

3. A dyestuff which is free from sulfonic acid and carboxylic acid groups and in its free base state corresponds to the formula

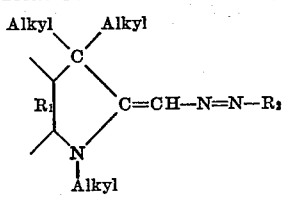

in which $R_1$ represents a benzene radical fused on to the heterocyclic ring at the positions indicated by the valence bonds, the Alkyl radicals contain at the most two carbon atoms and $R_2$ represents a benzene radical containing a single nitro group in ortho-position to the —N=N— group.

4. A dyestuff which is free from sulfonic acid and carboxylic acid groups and in its free base state corresponds to the formula

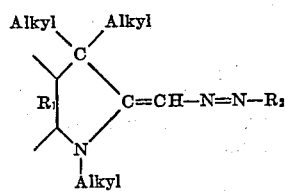

in which $R_1$ represents a benzene radical fused on to the heterocyclic ring at the positions indicated by the valence bonds, the Alkyl radicals contain at the most two carbon atoms and $R_2$ represents an anthraquinone radical bound in the 1-position to the —N=N— group.

5. A dyestuff which in its free base state corresponds to the formula

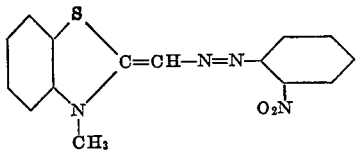

6. A dyestuff which in its free base state corresponds to the formula

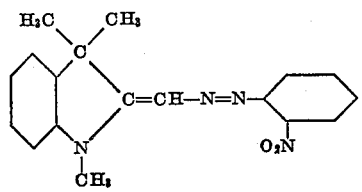

7. A dyestuff which in its free base state corresponds to the formula

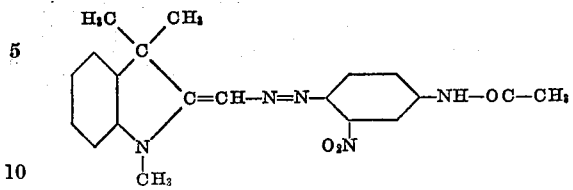

8. A dyestuff which in its free base state corresponds to the formula

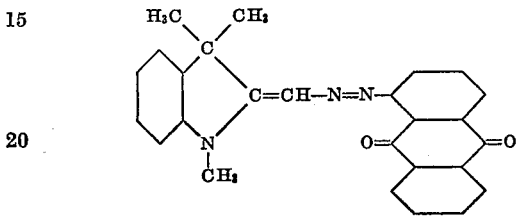

9. A dyestuff which in its free base state corresponds to the formula

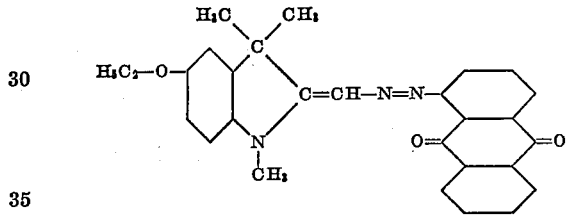

References Cited in the file of this patent
UNITED STATES PATENTS
2,464,785   Thompson _____ Mar. 22, 1949